United States Patent [19]

Rogers

[11] Patent Number: 4,609,779
[45] Date of Patent: Sep. 2, 1986

[54] TELECONFERENCING GRAPHICS APPARATUS AND SYSTEM

[75] Inventor: Bruce J. Rogers, Fridley, Minn.

[73] Assignee: Minnesota Mining and Manufacturing Company, St. Paul, Minn.

[21] Appl. No.: 620,322

[22] Filed: Jun. 13, 1984

[51] Int. Cl.$^4$ .............................................. H04N 1/22
[52] U.S. Cl. ............................... 179/2 R; 179/18 BC; 358/296
[58] Field of Search ................. 179/2 R, 2 A, 2 AM, 179/2 DP, 18 BC; 358/296–304; 250/561

[56] References Cited

U.S. PATENT DOCUMENTS

| | | | |
|---|---|---|---|
| Re. 28,375 | 3/1975 | Maydan et al. | 358/297 X |
| 3,051,044 | 8/1962 | McNaney | 358/300 X |
| 3,870,410 | 3/1975 | Abe | 350/561 X |
| 4,475,189 | 10/1984 | Herr et al. | 179/2 DP X |
| 4,503,468 | 3/1985 | Serinken et al. | 358/296 X |

FOREIGN PATENT DOCUMENTS

| | | | |
|---|---|---|---|
| 0084672 | 5/1982 | Japan | 358/296 |
| 0084673 | 5/1982 | Japan | 358/296 |

*Primary Examiner*—James L. Dwyer
*Attorney, Agent, or Firm*—Donald M. Sell; James A. Smith; Robert L. Marben

[57] ABSTRACT

A teleconferencing audio-graphics system using control signals transmitted by a transmitting station to control the operation of an overhead transparency projector and a motor driven roll mechanism that moves the transparency graphic copy output provided by a graphics copy output device over the transparency receiving platen of the projector. The graphics copy output device provide the transparency copy output in response to electronic input signals received from the transmitting station.

4 Claims, 4 Drawing Figures

TELECONFERENCING GRAPHICS APPARATUS AND SYSTEM

BACKGROUND OF THE INVENTION

1. Technical Field of the Invention

The invention presented herein relates to systems and the apparatus for providing the graphics for an audio plus graphics teleconferencing system and, in particular, to teleconferencing graphics apparatus using a graphics copy output device that receives electronic graphics generating signals from a remote location.

2. Description of the Prior Art

Teleconferencing systems is the general term applied to systems using a variety of technology aided interactive communications between people at two or more locations. Such systems include those providing communications that fall into a number of general categories: audio; audio plus graphics; slow-scan or freeze-frame video; continuous motion or live video and computer conferencing. Audio plus graphics teleconferencing involves the transmission of a variety of graphics before and/or during an audio meeting by the use of various equipment such as facsimile equipment, telewriting equipment or an electronic blackboard.

Audio plus graphics teleconferencing arrangements that use facsimile, telewriting equipment or similar graphics hard copy output devices provide only a single copy with each transmission of electronic graphic defining signals. This does not satisfy the need in situations where a number of participants will be considering the graphics sent by such equipment. Such systems require reproduction of the copy received to make the received graphics available to each participant or the received copy must be used to produce a transparent copy for use with an overhead projector for general viewing. In addition, such systems do not provide suitable control of the graphics presentation by the presenter and do not promote spontaneity on the part of the participants. The electronic blackboard represents a much more expensive piece of equipment ruling out its use by a number of users of audio plus graphics teleconferencing.

Another audio plus graphics teleconferencing system involves the use of a slide projector that can be remotely controlled. This system, of course, requires prior physical shipment to a viewer location of the slides that the presenter at a remote location will use.

SUMMARY OF THE INVENTION

The invention presented herein is embodied in apparatus for providing usable teleconferencing graphics for an audio plus graphics systems. The apparatus avoids the need for physical shipment of graphics to be presented, incorporates the low cost and user friendly aspects of a graphics copy output device, such as a facsimile machine, and avoids the interruptive processing required to place the graphics received via the graphics copy output device in a form where it can be viewed by a number of people. Apparatus embodying the invention includes a graphics hard copy output device, such as a facsimile machine, providing a transparent copy from a copy roll supply in response to electronic input signals received from a remote location; an overhead transparency projector having a transparency receiving platen; and a motor driven roll mechanism for moving the transparency graphic copy output of said graphics copy output device over the transparency receiving platen.

Another feature of the invention is the provision of a detector positioned for sensing the presence of locating indicia selectively positioned on the transparent graphic copy output. The signal provided by the detector when a locating indicia is detected is usable to stop the motor driven roll mechanism causing the transparency graphic copy to be properly positioned on the platen for projection onto a viewing screen. The indicia may also be coded to identify a particular transparency.

Another feature of the invention is the use of guide bars or rails along two edge portions of the platen of the overhead projector to guide the movement of the transparency copy material as it is moved over the platen.

The foregoing apparatus is useful for providing teleconferencing graphics for an audio plus graphics system in that it permits graphic defining signals to be transmitted from one location to a second location prior to or during a teleconference to provide graphic transparencies for presentation at the second location. Presentation at the second location can be under the control of a person at the first location in that control signals, such as tone signals or a carrier tone that is modulated, can be transmitted for controlling the on/off operation of the overhead transparency projector and the on/off plus forward/reverse operation of the motor driven roll mechanism to include selection of specific graphic images.

BRIEF DESCRIPTION OF THE DRAWING

A complete understanding of the present invention and the advantages thereof may be gained from a consideration of the following detailed description of an illustrative embodiment presented hereinbelow in connection with the accompanying drawing wherein.

DETAILED DESCRIPTION

Figure 1:
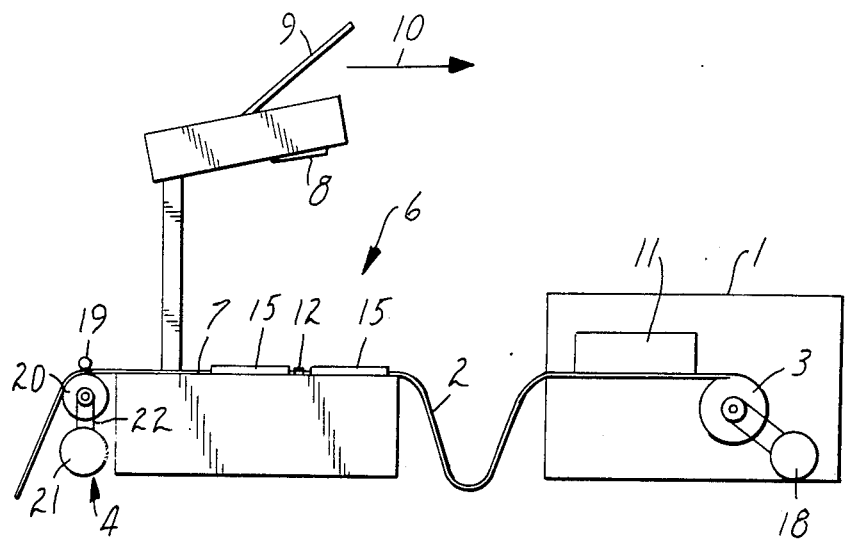
FIG. 1 is a side view of an illustrative embodiment of apparatus made in accordance with the principles of the present invention.
Figure 2:
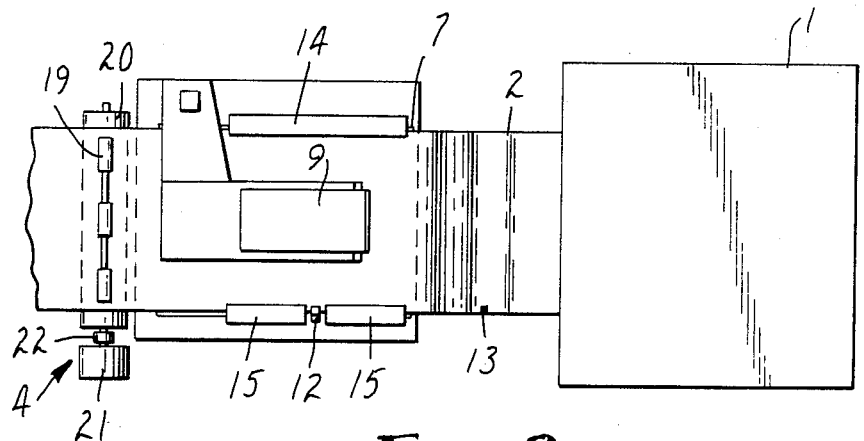
FIG. 2 is a top view of the apparatus of FIG. 1.

Referring to FIGS. 1 and 2 of the drawing, apparatus for providing graphics for an audio-graphics teleconferencing system is shown and includes a graphics copy output device 1 that provides a transparent graphics copy output 2 from a copy roll supply 3 in response to electronic input signals, drive roll mechanism 4 and an overhead transparency projector 6. The overhead projector 6 has a transparency receiving platen 7 that is positioned relative to the drive roll mechanism 4 so that the operation of the drive roll mechanism causes the transparent graphics copy output 2 to pass over the transparency receiving platen 7 for projection on a screen (not shown) by the optics 8 of the projector 6, which includes a mirror 9. The screen (not shown) is located in the direction of the arrow 10 in FIG. 2.

The graphics copy output device 1 can be provided by a facsimile machine, for example, or any other imaging device that provides a hard copy image based on electronic image defining input signals. Facsimile machines are well known and take on various forms. The output imaging technology used by various facsimile machines includes ink jet imaging, thermal imaging, impact printing and electrostatic imaging. The hard copy output of facsimile machines is normally in the form of plain paper, thermal paper or dielectric paper. In the case of the apparatus of FIGS. 1 and 2, transparent film material is used to provide the output copy. The transparent film material 2 is provided in roll form as indicated by the roll supply 3 that is driven by motor 18 coupled to the roll supply 3 allowing the output copy to be continuous. The image producing portion of the graphics copy output device 1, which receives the film material from the supply roll 3, is indicated by the block 11. In the case of a facsimile machine having a thermal print head for imaging, it is possible to use a dye-transfer coated film with the transparent film with the dye-transfer coating in contact with the transparent film. Selective application of heat by the thermal print head causes the dye coating to soften or melt and adhere to the transparent film. Provision must be made to dispose of the used dye-transfer film and allow the imaged transparent film to be moved over the platen of the overhead projector. As an alternative, when a thermal print head is used, the transparent film can be coated with a thermally sensitive coating that is transparent until selectively heated by the thermal print head to cause the coating to become opaque.

Figure 3:
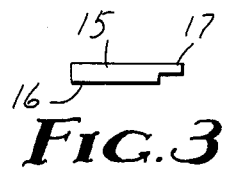
FIG. 3 is an end view of a part used with the apparatus of FIGS. 1 and 2.

Overhead transparency projectors are well known and are commercially available. Such projectors are normally operated by manually placing individual transparencies on the transparency receiving platen. The use of an overhead transparency projector 6 in the apparatus of FIGS. 1 and 2 is a modification of those commercially available to provide for the detection of the transparency copy 2 when an imaged area reaches a certain point in its travel over the platen 7. A detection device 12, which can be a light-to-electric transducer, such as a photocell, is positioned along one edge of the platen 7 so an edge of the transparency copy film 2 passes between the detection device 12 and a light source, which can be the light source (not shown) for the projector 6, as the film 2 is moved over the platen 7. The image formed on the film 2 at the graphics copy output device 1 includes opaque locating indicia, such as an opaque mark 13, at the edge of the film to be sensed by the detection device 12 that is usable to terminate operation of the drive roll mechanism 4 causing the image provided on the film 2 to be positioned for projection by the projector 6 when the light source (not shown) for the projector 6 is energized. By the use of locating indicia 13 that is coded to identify a particular graphic copy, the detection device 12 can detect such indicia to provide location information as well as information regarding the particular graphic copy associated with the indicia so that a selected graphic copy can be sought and positioned for projection. A further modification made to commercially available overhead transparency projectors to make them more suitable for use with the apparatus is the addition of guide or rail members 14 and 15 positioned and secured to the projector 6 along opposite edges of the platen 7 for guiding the transparency film 2 as it is moved over the platen 7. The guide member 15 is provided by two portions which are spaced apart to provide a space for positioning the detection device 12. FIG. 3 is an end view of the structure for guide members 14 and 15. The surface 16 is positioned next to the upper surface of the projector 6 so that the lip or tongue portion 17 of the guide member provides a space between the guide member and the platen 7 in which an edge of the transparency film 2 is received.

The drive roll mechanism 4 includes an idler roll 19, a drive roll 20, motor drive 21 and a coupling 22, such as a belt, between the drive roll and motor drive to apply the output of the motor drive to the drive roll. The idler roll 19 is positioned above the drive roll 20. The transparency film 2 passes between the idler roll 19 and the drive roll 20 with the idler roll 19 serving to keep the film 2 in contact with the drive roll 20 so as to cause the film 2 to be drawn by rotation of the drive roll 20 across the platen 7 of the projector 6. A support frame (not shown) can be used to secure the drive roll mechanism 4 to the projector 6 or to a common support (not shown), if used, for the projector 6 and graphics copy output device 1.

While the apparatus of FIGS. 1 and 2 shows the drive roll mechanism 4 positioned to pull the transparency 2 over the platen 7, the drive roll mechanism 4 can be positioned at the opposite end of the projector 6 so that it causes the transparency 2 to be pushed over the platen 7.

It should be noted that a space is provided between the output of the graphics copy output device 1 and the projector 6 allowing the transparencies that are ready for use to be stored by merely having the transparency 2 accumulate between the device 1 and the projector 6 as shown.

Figure 4:
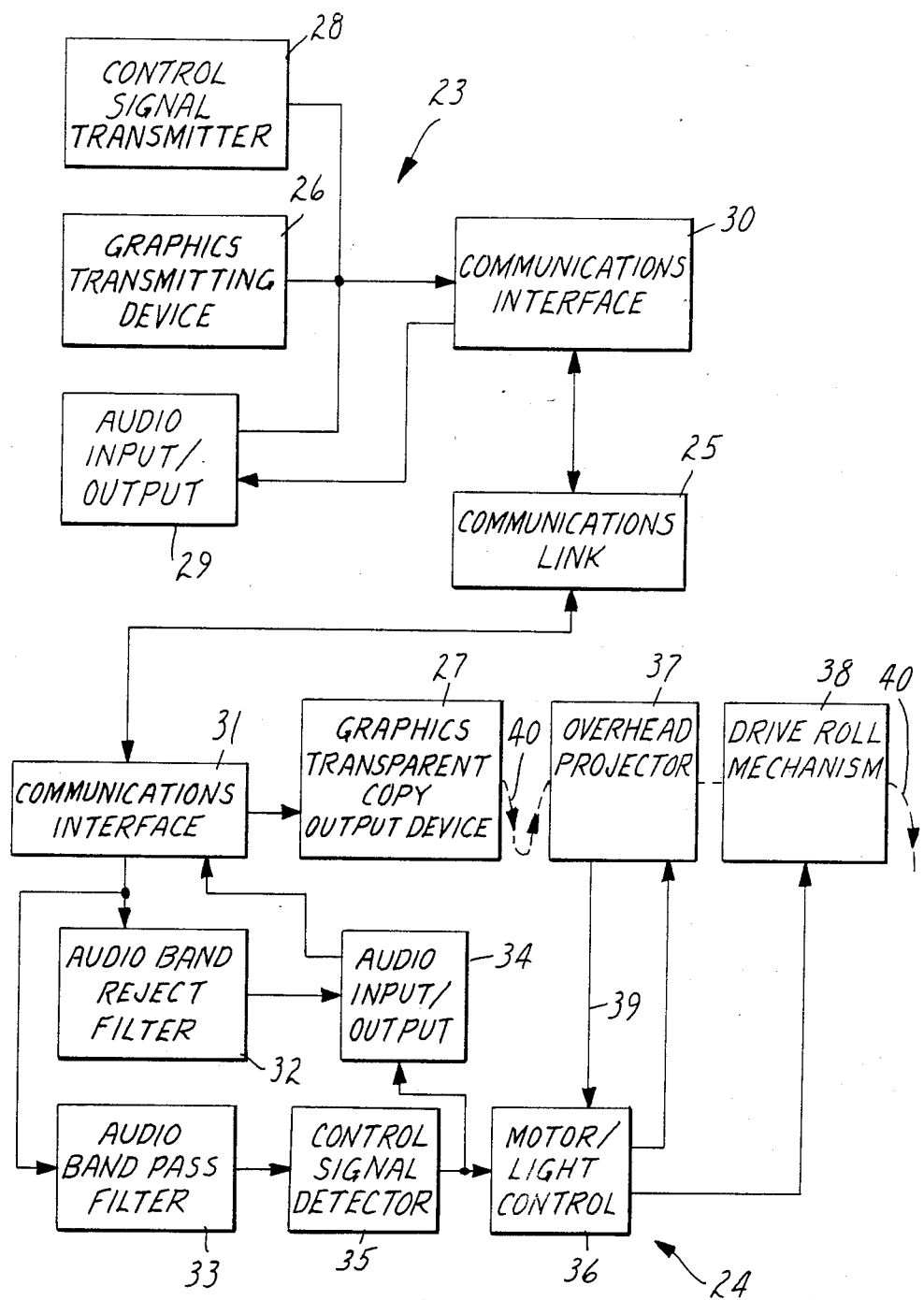
FIG. 4 is an illustrative embodiment of an audio-graphics telelconferencing system using the apparatus of FIG. 1.

FIG. 4 is a block diagram of one audio plus graphics teleconferencing system using the apparatus described in connection with FIGS. 1-3. The system includes an image or graphics plus audio transmitting station, indicated generally at 23 and an image or graphics plus audio utilization station, indicated generally at 24, which are coupled by a communications link 25.

The graphics transmitting station 23 includes a graphics transmitting device 26, which must be able to provide image defining electronic signals suitable for operation of the graphics transparent copy output device 27, which is a part of the graphics utilization station 24. The graphics transmitting device 26 and the graphics transparent copy output device 27 correspond to the device 1 of FIGS. 1 and 2, except, as noted, the device 26 must also be able to provide image defining electronic signals. The graphics transmitting station 23 also includes a control signal transmitter 28, audio input/output circuitry 29 and a communications interface 30. The control signal transmitter 28 provides for the selective transmission of control signals to the graphics utilization station 24. The control signal transmitter 28 can be of a type that permits the transmission of tone control signals of selected frequencies in a narrow band with the audio frequencies, for example, a 300 Hz band with a center frequency of about 1,650 Hz. It can be appreciated, of course, that a transmitter 28 that provides for the transmission of a carrier tone that is modulated, such as by PCM or PSK arrangements, is also suitable. The audio input/output circuitry 29 provides for the transmission of audio information to the station 24 and for the receipt of audio information from the station 24. The communications interface 30 provides the circuitry needed to connect the other portions of the graphics transmitting station 23 to the communications link 25, which normally is provided, at least in part, by the public telephone system. Since use of the public telephone system is generally required, at least as a part of the communications link 25, the control signal transmitter 28 is of a design, as has been indicated, that produces control signals at frequencies that can be transmitted by the public telephone system. This allows the same communication channel to be used for the audio information signals and the control signals since they can readily be separated by appropriate filters at the station 24.

The graphics utilization station 24, in addition to the copy output device 27 that has been mentioned, includes a communications interface 31, an audio band-reject filter 32, audio bandpass filter 33, audio input-/output circuitry 34, a control signals detector 35, a motor/light control 36, overhead transparency projector 37 and a drive roll mechanism 38. The overhead transparency projector 37 and drive roll mechanism 38 are the same as and arranged as described for the projector 6 and drive roll mechanism 4 of FIGS. 1 and 2. The communications interface 31 provides the circuitry needed to connect the other portions of station 24 to the communications link 25.

It is expected that most presentations to be made to one or more persons at the receiving station 24 by one or more persons at the transmitting station 23 will use transparencies that are prepared and electronically transmitted to the receiving station prior to the presentation. In the event the transmission of images is needed during a presentation session without an interruption of the audio transmissions, one channel would be provided by the communications link for audio transmissions with a separate channel provided for transmission of the graphic defining signals. Only one channel is required if a temporary interruption of the audio transmissions is acceptable.

Referring to audio transmissions received at the receiving station 24, such transmissions, except for the narrow band used for the control signals, are passed by the audio band reject filter 32 to the audio input/output circuitry which includes amplification and audio speakers providing the audio information for those at station 24. The audio signals are also presented to the audio bandpass filter 33 which has its output connected to the control signals detector circuit 35. The filter 33, however, is selective in that it provides for passage to the control signals detector circuit 35 of only the frequencies within the frequency band used for control signals. The transmission of image defining signals are received by the graphics transparent copy output device 27 and are preceded by signals establishing the necessary protocol to place the device 27 in condition to receive the image defining signals. Operation of the device 27, the overhead projector 37 and the drive roll mechanism 38 is in accordance with the description given for the corresponding apparatus described in connection with FIGS. 1 and 2 except that tone signals received from the transmitting station 23 by the tone detector 35 are applied to the motor/light control circuit 36 determine when the light for the overhead projector is turned on and off and when the motor for the drive roll mechanism 38 is energized and its direction of operation. The connection 39 between the detector 12 (FIGS. 1 and 2) for the overhead projector 37 and the motor/light control 36 provides an indication to the control 36 as to whether the transparency output copy, indicated by the dotted line 40, is in the proper position for energization of the lamp of the projector for projection onto a screen (not shown) by the projector 37. When the detector 12 (FIGS. 1 and 2) detects the mark 13 (FIG. 2), the motor/light control circuit 36 responds to terminate operation of the motor for the drive control mechanism 38. For purposes of explaining the invention, the control signals transmitted are provided by selected tone signals of various frequencies within a narrow frequency band, as previously mentioned. A tone control signal of one frequency that is then sent initiates the energization of the lamp for the projector 37, while a later second tone control signal of another frequency that is sent terminates energization of such lamp. A third tone control signal of a third frequency is sent when it is desired that the motor for the drive control mechanism 38 be energized to advance the transparency copy 40 for display of the next transparency. A fourth tone control signal of a fourth frequency is sent when it is desired that the motor for the drive control mechanism be energized to reverse the movement of the transparency copy 40 so one of any of the previously considered transparencies can be shown again.

It has been indicated that it may be desirable when only one communications channel is used to transmit images during a presentation. Audio transmissions must be suspended and it is necessary also that provision be made to prevent the image signals from appearing at the output of the audio input/output 34. Referring to FIG. 4, the output of the tone detector 35 is applied to the audio/input 34 which enables two tone control signals, having frequencies different from those already mentioned, to be transmitted from the station 23 to control the audio output. One of the two tone control signals when received by the audio input/output 34 is used to disable the audio output with the other of the two tone control signals when received by the audio input/output 34 being used to enable the audio output.

The transmitting station 23 capabilities can be increased by the addition of an overhead projector and drive roll mechanism plus the motor/light control as are used at the receiving station 24. Such an arrangement enables the person making an audio and graphics presentation to have a direct means to monitor when the transparency is positioned for projection at the receiving station. With such duplication, the presentation will be more effective since it then is being made with a setting similar to that at the receiving station.

It was indicated earlier that the drive roll mechanism 4 shown in FIGS. 1 and 2 can be positioned at the opposite side of the projector 6 so the transparency 2 can be pushed over the platen 7. It can be appreciated by those skilled in the art that with the mechanism 4 so positioned, it is possible to severe the transparency film 2 that is provided by the graphics output device 1 after all transparency graphics have been produced on the film 2 and roll the strip onto a supply roll that can be used in place of the drive roll 20. With such an arrangement the film 2 can be pushed over the platen 7 and, if a graphic that has been projected is required to be shown again, the motor 21 can be reversed to bring such graphic to the platen 7 for projection.

Many other modifications and variations of the present invention are possible in light of the above teachings without departing from the scope of the invention as defined in the appended claims.

What is claimed:

1. Teleconferencing apparatus useful for providing teleconferencing graphics including:
   a graphics copy output device for providing a transparent graphics copy output from a copy roll supply in response to electronic input signals received from a remote location;
   an overhead transparency projector having a transparency receiving platen, said overhead transparency projector spaced from said graphics copy output device for allowing any transparent graphics copy output from said graphics copy output device to be stored prior to presentment of the transparent graphics copy output to said overhead transparency projector; and a motor driven roll mechanism adapted for operation independent of the operation of said graphics copy output device for moving the transparent graphics copy output of said graphics copy output device over said transparency receiving platen.

2. Teleconferencing apparatus according to claim 1 wherein said overhead transparency projector includes a detector for sensing locating indicia positioned along an edge portion of the transparent graphics copy output.

3. Teleconferencing apparatus according to claim 1 wherein said overhead transparency projector includes a guide means positioned along opposite edge portions of said transparency receiving platen for guiding the movement of the transparent graphics copy output as it is moved over said transparency receiving platen.

4. An audio plus graphics teleconferencing system including:

a transmitting station having a graphics transmitting device for the transmission of image defining electronic signals and a control signal transmitter for the transmission of selective control signals;

a graphics utilization station adapted for receiving the image defining electronic signals and control signals from said transmitting station having a graphics copy output device for providing a transparent graphics copy output from a copy roll supply in response to the image defining electronic signals received from a remote location;

an overhead transparency projector at the graphics utilization station having a transparency receiving platen, said overhead transparency projector spaced from said graphics copy output device for allowing any transparent graphics copy output from said graphics copy output device to be stored prior to presentation of the transparent graphics copy output to said overhead transparency projector; and a motor driven roll mechanism adapted for operation independent of the operation of said graphics copy output device for moving the transparent graphics copy output of said graphics copy output device over said transparency receiving platen; means including a control signals detector and a motor/light control connected to said control signals detector, said overhead transparency projector and said motor driven roll mechanism for controlling said overhead transparency projector and said motor driven roll mechanism in response to the control signals received from said transmitting station.

* * * * *